Aug. 18, 1925.

G. P. GODFREY 1,550,536

TWO-CYCLE INTERNAL COMBUSTION ENGINE

Filed March 24, 1922     3 Sheets-Sheet 1

*Fig. 1.*

INVENTOR
George P. Godfrey
BY
ATTORNEYS

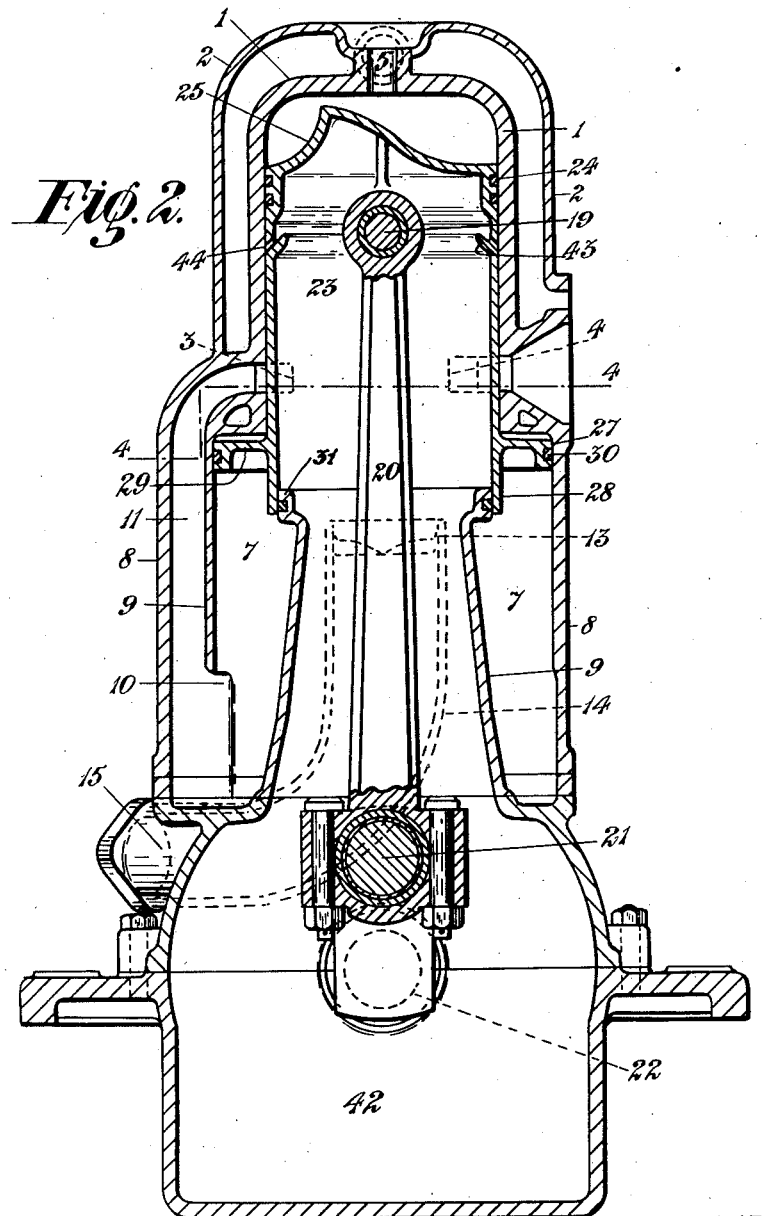

Aug. 18, 1925.
G. P. GODFREY
1,550,536
TWO-CYCLE INTERNAL COMBUSTION ENGINE
Filed March 24, 1922  3 Sheets-Sheet 3
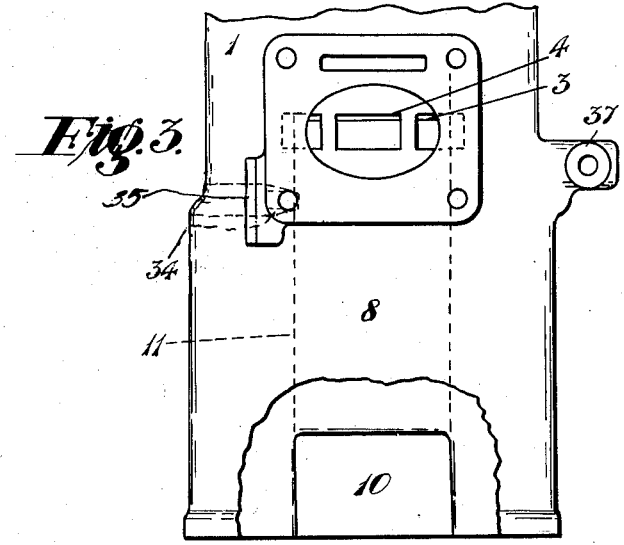
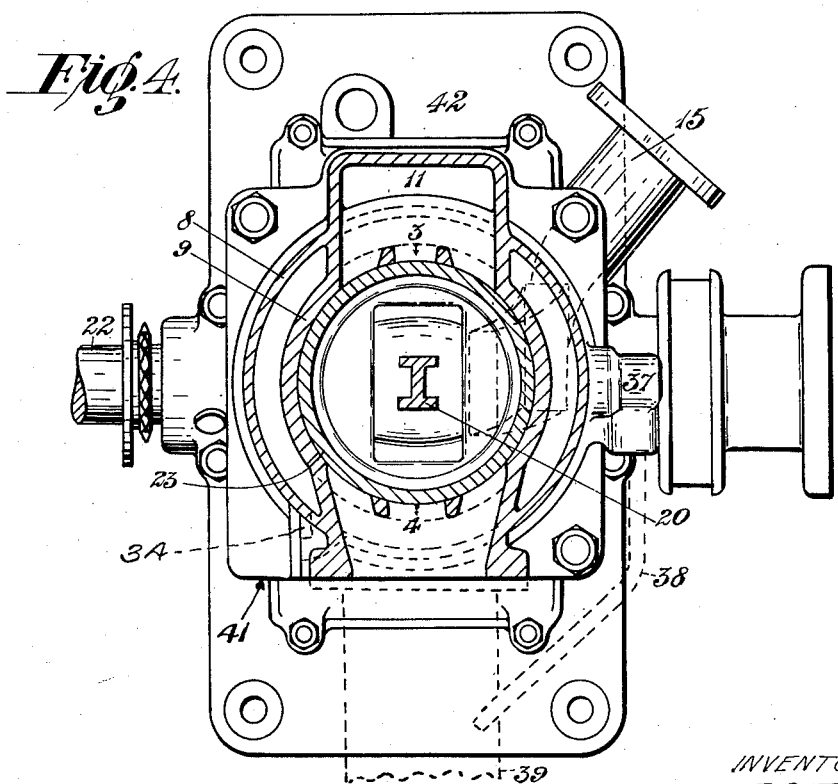
INVENTOR
George P. Godfrey
BY
ATTORNEYS Patented Aug. 18, 1925.

1,550,536

UNITED STATES PATENT OFFICE.

GEORGE PERCIVAL GODFREY, OF NORWOOD, SOUTH AUSTRALIA, AUSTRALIA.

TWO-CYCLE INTERNAL-COMBUSTION ENGINE.

Application filed March 24, 1922. Serial No. 546,393.

*To all whom it may concern:*

Be it known that I, GEORGE PERCIVAL GODFREY, a subject of the King of Great Britain and Ireland, residing at Sydneham Road, Norwood, State of South Australia, Commonwealth of Australia, have invented certain new and useful Improvements in Two-Cycle Internal-Combustion Engines, of which the following is a specification.

This invention relates to certain improvements in two cycle internal combustion engines and its object is to provide a light, compact and efficient engine suitable for use upon a motor car or motor cycle or for other purpose and capable of operation by either liquid or gaseous fuel. A further object of this invention is to dispense with the use of the crank case as a preliminary compression chamber for the mixture, thus preventing the fuel being intermingled with the lubricant, insuring a pure mixture in the power cylinder and a pure lubricant on the lubricated parts, and eliminating the blowing out of the lubricant from the bearings.

In order that my invention may be more readily understood it will now be described with reference to the accompanying drawings in which—

Fig. 1 is a sectional elevation of a single cylinder water cooled engine embodying my improvements.

Fig. 2 is a similar view at right angles to Fig. 1.

Fig. 3 is an elevation of part of the power cylinder and the outer wall of the induction cylinder.

Fig. 4 is a sectional plan on line 4—4 of Fig. 2.

Although I have illustrated an engine having only one cylinder any number of cylinders may be used, arranged according to well known practice.

The power cylinder 1 is provided with a water jacket 2 and it has a fuel inlet port 3 and an exhaust port 4 near its inner end. In its top end is an opening 5 to receive ignition devices (not shown) which are arranged and operated according to known practice.

The induction cylinder 7 has outer and inner walls 8 and 9 respectively. At the inner end of the outer wall 8 is an opening 10 to a duct 11 that terminates in the inlet port 3 of the power cylinder 1. This opening 10 is open at all times. Near the outer end of the inner wall 9 is a port 13 leading to a duct 14 that is formed in the wall and opens into the intake manifold 15 from a carburetor (not shown).

The piston is of the trunk type and is connected by a gudgeon pin 19 to the piston rod 20 which is in turn connected to the crank 21 of the crank shaft 22 as ordinarily.

The outer part of the piston forms the power piston 23 within the power cylinder 1 and it is provided with packing rings such as 24 and has a deflector baffle 25 of approved design. The inner part of the piston constituting the induction piston has outer and inner concentric walls 27 and 28 respectively connected by an annular ring 29. The outer wall 27 which is just long enough to accommodate a packing ring such as 30 fits the outer wall 8 of the induction cylinder 7. The inner wall 28 is somewhat longer than the outer wall 27 and fits the upper end 31 of the inner wall 9 of the induction cylinder which upper end is concentric with the outer wall 8 and is provided with a packing ring such as 32. The inner wall 28 of the induction piston covers and closes the inlet port 13 except during the outermost part of its travel the port being so shaped that its full width is exposed gradually as it is uncovered by the piston.

As a result of the above described construction the preliminary compression takes place during the power stroke in a cylinder that is open only to the influence of the induction piston, and as the whole of the force for such compression is transmitted directly from the power piston, permits a smaller or light flywheel than ordinarily, to be used. Also since the preliminary compression takes place below the piston, the weight of the piston, piston rod and crank all assist such compression, thus increasing the efficiency of the engine.

At the outer end of the induction cylinder 7 is an air vent or breather 34 that is provided with a non-return flap valve 34ª in a casing 35 and is adapted to admit air above the induction piston during the inward stroke of the piston the air being forced out through an outlet 36 on the return stroke. The air drawn in through said opening contacts directly with the outside of the wall of the piston and cools it. The outlet 36 has a non-return ball valve 36ª in a casing 37 and leads to a pipe such as 38 that terminates in the exhaust manifold 39 thus creating an air current, which scavenges the manifold.

For constructional purposes the inner wall 9 of the induction cylinder is made separately from the main cylinder casting, both castings being provided with flanges such as 41 whereby they are bolted to the crank case 42.

The parts are adapted to be lubricated by splash from the crank case 42. Part of the oil splashed into the interior of the power piston 23 is trapped in the lip 43 and passes through grooves such as 44 to the wall of the power cylinder 1.

The operation of my invention is as follows:—

First as to the power piston and cylinders:—During the upward stroke of the piston the charge is compressed within the power cylinder 1. Upon the piston reaching the top of its stroke the charge is fired, and as the piston moves downward and nears the bottom of its stroke the exhaust port 4 is opened permitting the burnt gases to escape, and the inlet port 3 is opened permitting a new partially compressed charge to flow from the induction cylinder 7 into the power cylinder 1.

As to the induction cylinder 7. During the upward stroke of the piston a partial vacuum is formed in the lower part of the cylinder, and in the passage 11 connecting such cylinder with the power cylinder 1. As the piston reaches the outer end or top of its stroke the inlet port 13 from the carburetor is opened and a charge is drawn from the carburetor into the cylinder 7. As the piston descends the inlet port 13 is closed and the charge is compressed until the piston nears the bottom of its stroke when the inlet port 3 of the power cylinder 1 is opened and the partially compressed charge flows from the induction cylinder 7 to the power cylinder 1 through the passage 11.

During the inward travel of the piston air is drawn in through the vent 34 and cools the piston and during the return movement it is driven out through the outlet 36 and pipe 38 causing a draught in the exhaust manifold 39, clearing away the exhaust gases therein and minimizing the back pressure.

What I claim is:—

1. A two cycle internal combustion engine comprising two chambers arranged tandemwise, the outer chamber forming the power cylinder and the inner chamber forming the induction and compression cylinder, the outer chamber being formed by a simple cylinder 1 closed at its outer end, and the inner chamber 7 being approximately annular and formed by an outer cylindrical wall 8 and an inner wall 9 and closed at its inner end, a piston of the trunk type comprising two parts corresponding with the two cylinders a smaller outer part 23 forming the power piston fitting to the outer chamber and a larger annular part 29 forming the induction and compression piston fitting to the induction and compression cylinder, a passage 11 in the outer wall of the induction chamber 7 providing communication between the lower end of such chamber and the lower end of the power cylinder, a passage 14 in the inner wall of the induction chamber 7 providing communication between the upper end of such chamber and the inlet intake manifold of a carburetor, and air inlet and air outlet passages communicating with the top of the induction chamber whereby air is admitted to and expelled from the top side of the induction piston.

2. A two cycle internal combustion engine comprising two chambers arranged tandemwise, the outer chamber forming the power cylinder and the inner chamber forming the induction and compression cylinder, the outer chamber being formed by a simple cylinder 1 closed at its outer end, and the inner chamber 7 being approximately annular and formed by an outer cylindrical wall 8 and an inner wall 9 and closed at its inner end, a passage 11 in the outer wall of the induction chamber 7 opening at one end into the lower end of such chamber and at the other end by means of an inlet port 3 into the lower end of the power cylinder, an outlet port 4 near the lower end of the power cylinder, a passage 14 in the inner wall of the induction chamber 7 opening at one end into the upper end of such chamber and at the other end to the intake manifold of a carburetor, a piston of the trunk type connected by a gudgeon pin and piston rod to the engine crank shaft which piston comprises two parts corresponding with the two cylinders, a smaller outer part 23 forming the power piston fitting to the outer chamber and a larger annular part 29 forming the induction and compression piston fitting to the induction and compression cylinder, such piston as it reciprocates to and fro opening and closing the ends of the said passages without the aid of any valve and air inlet and air outlet passages fitted with non return valves communicating with the top of the induction chamber whereby air is admitted to and expelled from the top side of the induction piston.

In testimony that I claim the foregoing as my invention I have signed my name this 8th day of February, 1922.

GEORGE PERCIVAL GODFREY.